(12) United States Patent
Castrejon, III et al.

(10) Patent No.: US 12,363,147 B2
(45) Date of Patent: Jul. 15, 2025

(54) SYSTEM FOR ADAPTIVE MANAGEMENT OF DOWNSTREAM TECHNOLOGY ELEMENTS

(71) Applicant: BANK OF AMERICA CORPORATION, Charlotte, NC (US)

(72) Inventors: Tomas M. Castrejon, III, Fort Mill, SC (US); Manu Jacob Kurian, Dallas, TX (US); David Nardoni, Sierra Madre, CA (US); Joel Townsend, Spring Church, PA (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 399 days.

(21) Appl. No.: 17/708,274

(22) Filed: Mar. 30, 2022

(65) Prior Publication Data
US 2023/0319079 A1 Oct. 5, 2023

(51) Int. Cl.
*H04L 9/40* (2022.01)
(52) U.S. Cl.
CPC ........ *H04L 63/1425* (2013.01); *H04L 63/126* (2013.01)
(58) Field of Classification Search
CPC ............... H04L 63/1425; H04L 63/126; H04L 63/10; H04L 63/12; H04L 63/14; H04L 63/1408; H04L 63/1433; H04L 63/105; H04L 63/20
See application file for complete search history.

(56) References Cited

U.S. PATENT DOCUMENTS

| | | | |
|---|---|---|---|
| 7,457,871 B2 | 11/2008 | Barsuk | |
| 8,751,867 B2 | 6/2014 | Marvasti et al. | |
| 9,088,541 B2 | 7/2015 | Rieke et al. | |
| 9,246,935 B2 | 1/2016 | Lietz et al. | |
| 9,772,898 B2 | 9/2017 | Deshpande et al. | |
| 9,853,995 B2* | 12/2017 | Golovanov | ......... H04L 63/1433 |
| 9,923,909 B2 | 3/2018 | Lietz et al. | |
| 10,205,736 B2 | 2/2019 | Rieke et al. | |
| 10,360,062 B2 | 7/2019 | Lietz et al. | |
| 10,375,101 B2* | 8/2019 | Berger | ............... H04L 63/1433 |
| 10,491,454 B2 | 11/2019 | Grigoryan et al. | |
| 10,542,024 B2 | 1/2020 | Balabine et al. | |

(Continued)

*Primary Examiner* — Farid Homayounmehr
*Assistant Examiner* — Mudasiru K Olaegbe
(74) *Attorney, Agent, or Firm* — Moore & Van Allen PLLC; Gabrielle M. Carlini

(57) ABSTRACT

A system is provided for detecting and remediating computing system breaches using computing network traffic monitoring. In particular, the system may identify one or more technology elements within a network as well as relationships between computing systems associated with said elements to determine a network topology. Based on the network topology, the system may use historical network traffic data associated with the technology elements in the network to generate predicted entry points and lateral pathways of a security breach that may take place within particular computing systems. Then, based on the technology elements affected as well as entry points and path traversals of the breach, the system may generate and/or implement one or more remediation steps to address existing and/or future breaches. In this way, the system may provide an intelligent method of augmenting the security of a computing network.

13 Claims, 2 Drawing Sheets

(56) References Cited

U.S. PATENT DOCUMENTS

| | | | |
|---|---|---|---|
| 10,855,700 B1* | 12/2020 | Jeyaraman | H04L 63/1425 |
| 10,929,363 B2 | 2/2021 | Reichert et al. | |
| 11,042,320 B2 | 6/2021 | Li et al. | |
| 11,089,041 B2 | 8/2021 | Balabine et al. | |
| 11,121,914 B2 | 9/2021 | Ledbetter et al. | |
| 11,196,636 B2 | 12/2021 | Rieke et al. | |
| 2006/0037077 A1 | 2/2006 | Gadde et al. | |
| 2010/0161791 A1* | 6/2010 | Duffield | H04L 43/026 709/224 |
| 2015/0142935 A1 | 5/2015 | Srinivas et al. | |
| 2015/0304343 A1 | 10/2015 | Cabrera et al. | |
| 2016/0359887 A1* | 12/2016 | Yadav | H04L 63/1425 |
| 2018/0027016 A1* | 1/2018 | Touboul | G06F 21/56 726/23 |
| 2018/0367548 A1* | 12/2018 | Stokes, III | H04L 63/1416 |
| 2021/0243208 A1* | 8/2021 | Rubin | G06F 21/552 |
| 2021/0377106 A1 | 12/2021 | Ledbetter et al. | |
| 2022/0030021 A1 | 1/2022 | Balabine et al. | |
| 2022/0159033 A1* | 5/2022 | Mizrahi | H04L 63/1441 |

\* cited by examiner

```
┌─────────────────────────────────────────────────────────┐
│ DETECT A TOPOLOGY OF ONE OR MORE COMPUTING SYSTEMS IN   │
│ A NETWORK, THE ONE OR MORE COMPUTING SYSTEMS            │
│ COMPRISING AN UPSTREAM TECHNOLOGY ELEMENT AND A         │
│ DOWNSTREAM COMPUTING ELEMENT                            │
│ 201                                                     │
└─────────────────────────────────────────────────────────┘
                            │
                            ▼
┌─────────────────────────────────────────────────────────┐
│ RETRIEVE ONE OR MORE HISTORICAL NETWORK TRAFFIC LOGS    │
│ FROM THE ONE OR MORE COMPUTING SYSTEMS IN THE NETWORK   │
│ 202                                                     │
└─────────────────────────────────────────────────────────┘
                            │
                            ▼
┌─────────────────────────────────────────────────────────┐
│ BASED ON THE ONE OR MORE HISTORICAL NETWORK TRAFFIC     │
│ LOGS, DETECT ONE OR MORE DATA TRANSFERS BETWEEN THE     │
│ UPSTREAM TECHNOLOGY ELEMENT AND THE DOWNSTREAM          │
│ TECHNOLOGY ELEMENT                                      │
│ 203                                                     │
└─────────────────────────────────────────────────────────┘
                            │
                            ▼
┌─────────────────────────────────────────────────────────┐
│ GENERATE A RANKED LIST OF LIKELIEHOOD SCORES FOR EACH   │
│ OF THE ONE OR MORE DATA TRANSFERS, WHEREIN THE          │
│ LIKELIHOOD SCORES REFLECT A LIKELIHOOD OF LATERAL       │
│ MOVEMENT OF A VECTOR FROM THE UPSTREAM TECHNOLOGY       │
│ ELEMENT TO THE DOWNSTREAM TECHNOLOGY ELEMENT            │
│ THROUGH THE ONE OR MORE DATA TRANSFERS                  │
│ 204                                                     │
└─────────────────────────────────────────────────────────┘
                            │
                            ▼
┌─────────────────────────────────────────────────────────┐
│ BASED ON THE RANKED LIST OF LIKELIHOOD SCORES,          │
│ AUTOMATICALLY IMPLEMENT ONE OR MORE REMEDIATION STEPS   │
│ ASSOCIATED WITH THE VECTOR                              │
│ 205                                                     │
└─────────────────────────────────────────────────────────┘
```

FIG. 2

SYSTEM FOR ADAPTIVE MANAGEMENT OF DOWNSTREAM TECHNOLOGY ELEMENTS

FIELD OF THE INVENTION

The present disclosure embraces a system for adaptively detecting and remediating the effects of computing system breaches on downstream technology elements.

BACKGROUND

There is a need for a way to identify, prevent, and rectify the downstream effects of security threats on computing devices within a network environment.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for detecting and remediating computing system breaches using computing network traffic monitoring. In particular, the system may identify one or more technology elements within a network as well as relationships between computing systems associated with said elements to determine a network topology. Based on the network topology, the system may use historical network traffic data associated with the technology elements in the network to generate predicted entry points and lateral pathways of a security breach that may take place within particular computing systems. Then, based on the technology elements affected as well as entry points and path traversals of the breach, the system may generate and/or implement one or more remediation steps to address existing and/or future breaches. In this way, the system may provide an intelligent method of augmenting the security of a computing network.

Accordingly, embodiments of the present disclosure provide a system for detecting and remediating computing system breaches by monitoring a downstream technology element. The system may comprise a memory device with computer-readable program code stored thereon; a communication device; and a processing device operatively coupled to the memory device and the communication device. The processing device may be configured to execute the computer-readable program code to detect a topology of one or more computing systems in a network, the one or more computing systems comprising an upstream technology element and the downstream technology element; retrieve one or more historical network traffic logs from the one or more computing systems in the network; based on the one or more historical network traffic logs, detect one or more data transfers between the upstream technology element and the downstream technology element; generate a ranked list of likelihood scores for each of the one or more data transfers, wherein the likelihood scores reflect a likelihood of lateral movement of a vector from the upstream technology element and the downstream technology element through the one or more data transfers; and based on the ranked list of likelihood scores, automatically implement one or more remediation steps associated with the vector.

In some embodiments, the one or more historical network traffic logs comprises an origin network traffic log stored on a first computing system associated with the upstream technology element and a destination network traffic log stored on a second computing system associated with the downstream technology element, wherein detecting the one or more data transfers between the upstream technology element and the downstream technology element comprises identifying, from the origin network traffic log, one or more outgoing data transfers from the upstream technology element and the downstream technology element; and matching, using the destination network traffic log, the one or more outgoing data transfers with one or more incoming data transfers from the upstream technology element and the downstream technology element.

In some embodiments, detecting the one or more data transfers between the upstream technology element and the downstream technology element further comprises generating a computed hash of the origin network traffic log using a hash algorithm; retrieving a validation hash associated with the origin network traffic log from an integrity validation data store hosted on a distributed server network; and executing a validation check of the origin network traffic log by comparing the computed hash of the origin network traffic log with the validation hash associated with the origin network traffic log.

In some embodiments, the computer-readable program code, when executed by the processing device, further causes the processing device to generate a graph database based on the topology of the one or more computing systems in the network, wherein the graph database comprises a first node representing the upstream technology element and a second node representing the downstream technology element, wherein the first node is linked to the second node by a relationship comprising the one or more data transfers between the upstream technology element and the downstream technology element.

In some embodiments, generating the ranked list of likelihood scores comprises identifying one or more parameters associated with the one or more data transfers between the upstream technology element and the downstream technology element; and computing increases or decreases to the likelihood scores based on the one or more parameters.

In some embodiments, the one or more parameters comprises at least one of vector intelligence data, data transfer type, and operating system version.

In some embodiments, the one or more remediation steps comprises at least one of applying software updates, implementing a network segmentation scheme, performing a system wipe, disabling a software element, and disabling a hardware element.

Embodiments of the present disclosure also provide a computer program product for detecting and remediating computing system breaches by monitoring a downstream technology element, the computer program product comprising at least one non-transitory computer readable medium having computer-readable program code portions embodied therein, the computer-readable program code portions comprising executable code portions for detecting a topology of one or more computing systems in a network, the one or more computing systems comprising an upstream technology element and the downstream technology element; retrieving one or more historical network traffic logs from the one or more computing systems in the network; based on the one or more historical network traffic logs, detecting one or more data transfers between the upstream technology element and the downstream technology element; generating a ranked list of likelihood scores for each of the one or more data transfers, wherein the likelihood scores reflect a likelihood of lateral movement of a vector from the upstream technology element and the downstream technology element through the one or more data transfers; and based on the ranked list of likelihood scores, automatically implementing one or more remediation steps associated with the vector.

In some embodiments, the one or more historical network traffic logs comprises an origin network traffic log stored on a first computing system associated with the upstream technology element and a destination network traffic log stored on a second computing system associated with the downstream technology element, wherein detecting the one or more data transfers between the upstream technology element and the downstream technology element comprises identifying, from the origin network traffic log, one or more outgoing data transfers from the upstream technology element and the downstream technology element; and matching, using the destination network traffic log, the one or more outgoing data transfers with one or more incoming data transfers from the upstream technology element and the downstream technology element.

In some embodiments, detecting the one or more data transfers between the upstream technology element and the downstream technology element further comprises generating a computed hash of the origin network traffic log using a hash algorithm; retrieving a validation hash associated with the origin network traffic log from an integrity validation data store hosted on a distributed server network; and executing a validation check of the origin network traffic log by comparing the computed hash of the origin network traffic log with the validation hash associated with the origin network traffic log.

In some embodiments, the computer-readable program code portions further comprise executable code portions for generating a graph database based on the topology of the one or more computing systems in the network, wherein the graph database comprises a first node representing the upstream technology element and a second node representing the downstream technology element, wherein the first node is linked to the second node by a relationship comprising the one or more data transfers between upstream technology element and the downstream technology element.

In some embodiments, generating the ranked list of likelihood scores comprises identifying one or more parameters associated with the one or more data transfers between the upstream technology element and the downstream technology element; computing increases or decreases to the likelihood scores based on the one or more parameters.

In some embodiments, the one or more parameters comprises at least one of vector intelligence data, data transfer type, and operating system version.

Embodiments of the present disclosure also provide a computer-implemented method for detecting and remediating computing system breaches by monitoring a downstream technology element, wherein the computer-implemented method comprises detecting a topology of one or more computing systems in a network, the one or more computing systems comprising an upstream technology element and the downstream technology element; retrieving one or more historical network traffic logs from the one or more computing systems in the network; based on the one or more historical network traffic logs, detecting one or more data transfers between the upstream technology element and the downstream technology element; generating a ranked list of likelihood scores for each of the one or more data transfers, wherein the likelihood scores reflect a likelihood of lateral movement of a vector from the upstream technology element and the downstream technology element through the one or more data transfers; and based on the ranked list of likelihood scores, automatically implementing one or more remediation steps associated with the vector.

In some embodiments, the one or more historical network traffic logs comprises an origin network traffic log stored on a first computing system associated with the upstream technology element and a destination network traffic log stored on a second computing system associated with the downstream technology element, wherein detecting the one or more data transfers between the upstream technology element and the downstream technology element comprises identifying, from the origin network traffic log, one or more outgoing data transfers from the upstream technology element and the downstream technology element; and matching, using the destination network traffic log, the one or more outgoing data transfers with one or more incoming data transfers from the upstream technology element and the downstream technology element.

In some embodiments, detecting the one or more data transfers between the upstream technology element and the downstream technology element further comprises generating a computed hash of the origin network traffic log using a hash algorithm; retrieving a validation hash associated with the origin network traffic log from an integrity validation data store hosted on a distributed server network; and executing a validation check of the origin network traffic log by comparing the computed hash of the origin network traffic log with the validation hash associated with the origin network traffic log.

In some embodiments, the computer-implemented method further comprises generating a graph database based on the topology of the one or more computing systems in the network, wherein the graph database comprises a first node representing the upstream technology element and a second node representing the downstream technology element, wherein the first node is linked to the second node by a relationship comprising the one or more data transfers between the upstream technology element and the downstream technology element.

In some embodiments, generating the ranked list of likelihood scores comprises identifying one or more parameters associated with the one or more data transfers between the upstream technology element and the downstream technology element; computing increases or decreases to the likelihood scores based on the one or more parameters.

In some embodiments, the one or more parameters comprises at least one of vector intelligence data, data transfer type, and operating system version.

In some embodiments, the one or more remediation steps comprises at least one of applying software updates, implementing a network segmentation scheme, performing a system wipe, disabling a software element, and disabling a hardware element.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
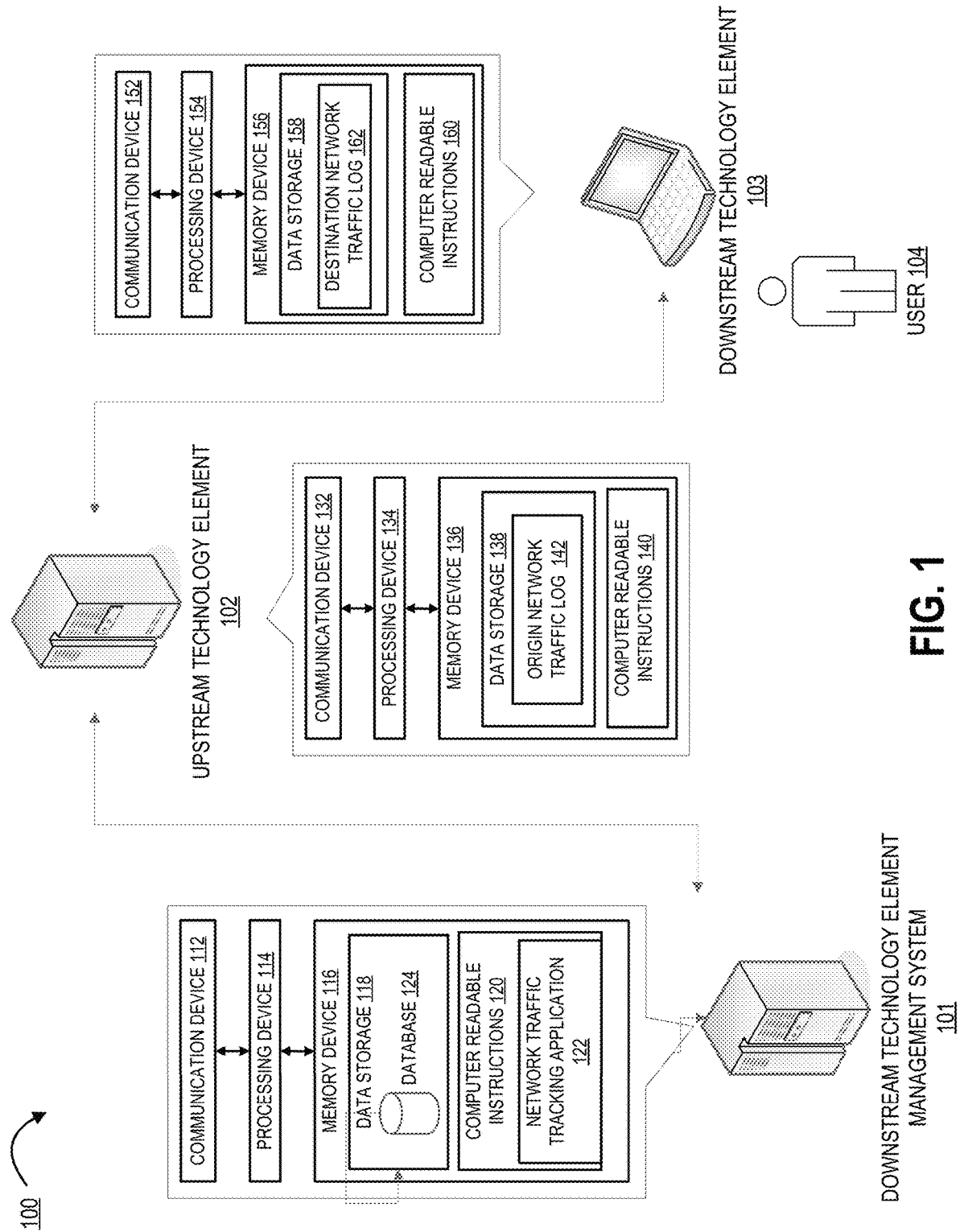

Having thus described embodiments of the invention in general terms, reference will now be made to the accompanying drawings, wherein:

FIG. 1 illustrates an operating environment for the downstream technology element management system, in accordance with one embodiment of the present disclosure; and FIG. 2 illustrates a process flow for the downstream technology element management system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Breach vector" or "vector" as used herein may refer to an object or method through which an unauthorized user, device, or code may gain access to a computing system. Examples of such breach vectors may include computer viruses, malware, security vulnerabilities, or the like. Accordingly, in some embodiments, breach vectors may be transmitted or spread from an infected technology element to one or more destination technology elements (e.g., through a network connection).

"Network traffic" as used herein may refer to the various types of data that may be received and transmitted across the network by computing systems within the network. Accordingly, "network traffic data" as used herein may refer to records or logs regarding and/or associated with the network traffic between computing systems within the network.

"Network segmentation" or "segmentation" as used herein may refer to a process for using physical or logical boundaries to separate hardware and/or software objects from one another within a network to create subsections of the network. Examples of segmentation methods or implements may include routers, switches, physical cable disconnects, wireless jammers, firewall rules, virtual local area networks (VLAN), and the like. Segmentation may be carried out at macro levels (e.g., data centers, geographic regions, or the like) and/or at the micro level (specific computing systems, hardware devices, and/or data).

A "downstream technology element" as used herein may refer to a computing system, device, software element, and/or hardware element whose operation depends on an input from or other interaction with another computing system, device, software element, and/or hardware element within the network.

Reference may further be made herein to a "graph database," which may refer to a type of database that comprising data structures such as "nodes" or "vertices" (e.g., the items or objects to be tracked by the graph database), "edges" or "relationships" (e.g., connections between nodes that explain the relationships between such nodes), and/or properties (e.g., information associated with nodes, relationships, and/or other properties).

Computing systems in a network environment may transmit and/or receive various types of data to and/or from one another and/or other computing systems that may exist outside of the network environment. In such scenarios, a computing system may be affected by a breach vector such as a computer virus. Furthermore, the breach vector may spread to downstream technology elements within the network. Accordingly, it may be desirable to track the network traffic between computing systems in the network environment to determine the vulnerable surfaces as well as the pathways that a breach vector may take when infecting certain computing systems. In addition, it may be desirable to pause or otherwise inhibit network traffic to downstream technology elements after a breach vector has been identified.

In this regard, the system as described herein provides a system for tracking network data to predict breach vector pathways and behaviors and to intelligently generate remediation steps to improve the resistance of the downstream technology elements and/or pathways to the identified breach vectors. In particular, the system may track various types of network traffic data for each computing system within the network to generate network traffic logs for each computing systems, where the network traffic data may include information regarding what types of data and/or network interactions occurred with respect to each computing system. For instance, the network traffic data may include outgoing and/or incoming network traffic data which may include information regarding data that was sent from a particular computing system (e.g., downstream and/or upstream technology element, network traffic type, network protocol used, IP addresses, hardware addresses, network port used, duration of connection, computing system hardware and/or software metadata, and the like). In some embodiments, the individual log data may be stored within each computing system and aggregated by the system on an as-needed basis to perform the predictive and/or remediation processes as described herein.

In some embodiments, the system may further comprise a data integrity checking mechanism to ensure the validity of the network traffic logs generated for each computing system. For example, the system may generate a hash output of the network traffic logs (e.g., using a hash algorithm) and subsequently store the hash output on the local computing system and/or other computing systems within the network. In some embodiments, the hash output may be stored on an integrity validation server and/or a distributed register (such that the hash output may be hosted on multiple servers in a distributed manner). The hash outputs stored on the validation server may be referred to herein as "validation hashes." In such embodiments, the integrity validation server and/or the computing systems hosting the distributed register may perform integrity validation of the network traffic logs on affected systems. In this way, if a breach vector comprises a particular computing system, the system may be able to ensure the validity of the information within the network traffic logs.

Based on the network traffic data, the system may generate a network topology which maps the various types of network connections that were established across the computing systems in the network environment as well as the types of data that were transferred across such connections (e.g., a graph database where the nodes may be upstream and/or downstream technology elements and relationships are established according to network traffic across nodes). For example, upon detecting that a breach vector has affected a certain computing system, the system may examine the network traffic logs of the affected computing system to determine which network interactions may have caused the infection (e.g., where the breach vector came from, what method or type of network interaction caused the infection, or the like) and which downstream technology elements within the network may also be affected by the breach vector (e.g., how the breach vector may spread within the network).

In some embodiments, the system may perform a likelihood calculation of the various network connections and/or interactions to determine the likely entry points or upstream technology elements, pathways, and/or endpoints or downstream technology elements of a particular breach vector by using historical data within the network traffic logs of affected computing systems. In addition to logs of the actual traversal of the breach vectors, the system may calculate a likelihood score which indicates the likelihood that a breach vector may traverse technology elements along a particular pathway. For instance, a File Transfer Protocol ("FTP") connection to transfer an executable file on port 21 from a file server to a desktop computer may have a relatively higher likelihood of transmitting a breach vector (and accordingly, a higher likelihood score) than web traffic on port 80 from a web server to a desktop computer (which may have a relatively lower likelihood score). In some embodiments, the likelihood score calculations may be dynamically adjusted using machine learning algorithms which may track actual traversals of breach vectors to increase or decrease likelihood scores for certain pathways according to the observed data. In some embodiments, the system may further incorporate information from external intelligence feeds on breach vectors (e.g., information on modes of infection and/or path traversals for certain breach vectors) in generating the likelihood score. For example, the intelligence feed may indicate that a particular breach vector is commonly transmitted through downloads of e-mail attachments. Accordingly, e-mail attachment downloads may have an increased likelihood score with respect to the identified breach vector.

In some embodiments, the system may generate a graph database in which nodes may represent upstream technology elements and/or downstream technology elements that may be affected by a breach vector (e.g., computing systems or technology elements which may serve as the entry point for a breach vector and/or computing systems or technology elements which may serve as intermediaries or end points for the breach vector). In such embodiments, each of the nodes may be defined by one or more properties that further define the node. For instance, a node representing a particular server may have various properties associated with it that may define a hardware ID or address, operating system, available network ports, or the like. Accordingly, the nodes may be linked to one another through one or more relationships, where the relationships may define a flow of network traffic between the nodes. For example, a relationship may be defined from an upstream technology element (e.g., a server) and a downstream technology element (e.g., a desktop computer), where the relationship may be a file transfer on port 80 from the server to the desktop computer.

An exemplary use case is provided for illustrative purposes. In one exemplary embodiment, the system may detect that a server in the network has been affected by a vector such as a computer virus. Based on the network topology as defined in the graph database, the system may generate a ranked list of network traffic data that may be most likely to cause a transmission of the computer virus to other downstream technology elements. In this regard, the system may use external or internal intelligence feeds to calculate a probability of transmission through certain types of network traffic. For example, the intelligence data may indicate that the computer virus affects systems running a particular operating system and is most likely to spread through file transfers on port 21.

Accordingly, the system may perform likelihood calculations for each of the relationships between the server and the various upstream and downstream technology elements with which the server has had contact. To illustrate, the server may have transferred an executable file on port 21 to a desktop computer running a first operating system, where said transfer may be represented by a first relationship. The same server may have also transferred web data (e.g., HTML files, image files, and the like) on port 80 to a laptop computer running a second operating system, where said transfer may be represented by a second relationship. Based on the type of file transfer (e.g., transfer of an executable file versus web data), the port used to connection the systems, the intelligence feed data (e.g., data showing that the first operating system is more vulnerable than the second operating system), the system may calculate a higher likelihood score for the first relationship and a lower likelihood score for the second relationship (e.g., the first relationship or pathway has a higher likelihood of lateral movement of the computer virus compared to the second relationship or pathway). The likelihood scores may then be included in a ranked list of relationships (e.g., instances of contact with other computing systems) that may be ordered based on likelihood scores of the relationships (e.g., from highest to lowest). In calculating the likelihood scores, the system may further take into account historical scoring and/or rankings and adjust the scoring algorithms over time (e.g., via machine learning) such that the accuracy of the likelihood scores continue to increase.

Based on the generated list of likelihood scores, the system may automatically implement one or more remediation steps to remediate the chance of lateral movement of the vector. In some embodiments, certain remediation steps may be executed if a given likelihood score exceeds a certain threshold. Each of the one or more remediation steps may, once implemented, reduce the likelihood score by a defined amount. In such embodiments, one or more remediation steps may be selected by the system to reduce the likelihood score of a particular pathway such that the likelihood score falls below the designated threshold. The system may be configured to implement remediation steps in an escalating order of disruption to the affected systems and/or networks. For instance, the system may first automatically update antivirus software (e.g., update virus definition) for the systems along the likely transmission pathways of the computer virus. If updating the antivirus software has failed to reduce the likelihood score below the designated threshold, the system may implement a more effective (but disruptive) remediation step, such as network segmentation or isolation of the infected computing systems. In cases of high likelihood scores, the system may be configured to automatically wipe the memory of the affected computing systems and/or restore its factory settings. In some embodiments, the system may be configured to disable certain technology elements until the likelihood score falls below the designated threshold, such as disabling a camera on a user device, disabling user access to a particular software application, or the like.

The system as described herein confers a number of technological advantages over conventional network security systems. In particular, by using historical data in conjunction with machine learning algorithms, the system may dynamically predict the potential pathways of incoming vectors, thereby allowing the system to more effectively contain the lateral movement of such vectors. Furthermore, by automatically implementing remediation steps based on likelihood scores, the system provides a way to seamlessly and efficiently address security issues in the network environment while simultaneously minimizing the disruptions to the processes of the affected (or potentially affected) downstream technology elements within the network.

Turning now to the figures, FIG. 1 illustrates an operating environment 100 for the downstream technology element management system, in accordance with one embodiment of the present disclosure. In particular, FIG. 1 illustrates a downstream technology element management system 101 that is operatively coupled, via a network, to an upstream technology element 102 and/or a downstream technology element 103. In such a configuration, the network traffic tracking system 101 may transmit information to and/or receive information from the upstream technology element 102 and/or the downstream technology element 103. It should be understood that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts an upstream technology element 102 and a downstream technology element 103, some embodiments may include multiple upstream technology elements and/or downstream technology elements in the network environment. Furthermore, it will be appreciated by those skilled in the art that network traffic may be bidirectional between computing systems such that the upstream technology element 102 (or any other upstream computing system) may be a downstream technology element with respect to certain types of network traffic, whereas the downstream technology element 103 (or any other downstream computing system) may be an upstream technology element for certain types of network traffic. Additionally or alternatively, the downstream technology element 103 may be a separate computing system from the upstream technology element as depicted, or the downstream technology element 103 may be fully integrated within the same computing system as the upstream technology element 102.

It should also be understood that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the downstream technology element management system 101 is depicted as a single unit, the functions of the downstream technology element management system 101 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the downstream technology element management system 101 may be a networked server, desktop computer, laptop computer, routing device, or other type of computing system within the network environment which performs the processes for tracking network data, reading network traffic logs, generating and/or maintaining a graph database and/or network topology information, generating likelihood scores, implementing remediation processes, and the like, as described herein. Accordingly, the downstream technology element management system 101 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the upstream technology element 102 and/or the downstream technology element 103. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a database 124, which may comprise information regarding the topology of the network, information about various nodes within the network and/or the types of network traffic that may pass between such nodes, intelligence on vectors that may compromise the nodes, and the like. Accordingly, in one embodiment, the database 124 may comprise a graph database which reflects the network topology associated with the various computing systems in the network, the relationships between the computing systems (e.g., the types of data transmitted back and forth between the nodes), and the like. The database 124 may further comprise historical data regarding the monitored traffic within the network, which in turn may be used to drive the processes for generating likelihood scores for the relationships between the nodes, as described elsewhere herein. It should be understood that in alternative embodiments, the database 124 may be hosted on a separate computing system (e.g., a database server) instead of being hosted on the network traffic tracking system 101.

The memory device 116 may have computer-readable instructions 120 stored thereon, where the computer-readable instructions 120 may comprise a network traffic tracking application 122, which may comprise computer-executable program code which may instruct the processing device 114 to perform certain logic, data processing, and data storing functions of the application to accomplish the entity's objectives. For instance, the network traffic tracking application 122 may monitor the network traffic between the upstream technology element 102 and the downstream technology element 103 to identify and predict potential lateral movement of vectors that may affect the upstream technology element 102 and/or the downstream technology element 103. In this regard, the network traffic tracking application 122 may pull data from the database 124 (e.g., the graph database and/or vector intelligence data) to perform likelihood calculations for each relationship between the upstream technology element 102 and the downstream technology element 103.

As further illustrated in FIG. 1, the operating environment 100 may further comprise an upstream technology element 102 in operative communication with the downstream technology element management system 101. In particular, the upstream technology element 102 may be a computing system from which a vector (e.g., a computer virus) may spread to other devices in the network (e.g., the downstream technology element 103). Accordingly, the upstream technology element 102 may be a computing system such as a server or networked terminal, though it is within the scope of the disclosure for the upstream technology element 102 to be a device such as a desktop computer, laptop, IoT device, smartphone, tablet, single-board computer, or the like, or the upstream technology element 102 may be a hardware or software element of one of said devices (i.e. a software application, camera, microphone, and/or the like.)

The upstream technology element 102 may comprise a processing device 134 operatively coupled to a communication device 132 and a memory device 136 having data storage 138 and computer readable instructions 140 stored thereon. The data storage 138 may comprise an origin network traffic log 142, which may comprise a historical record of network traffic data sent and/or received by the upstream technology element 102. For instance, in embodiments in which the upstream technology element 102 is a web server, the origin network traffic log 142 may comprise a record of an incoming web data request on port 80 from the downstream technology element 103, and another record of outgoing web data to the downstream technology element 103. By maintaining such a historical record of network traffic, each instance of data transfer involving the upstream technology element 102 may be evaluated by the downstream technology element management system 101 to establish relationships between the upstream technology element 102 and the other technology elements within the network (e.g., the downstream technology element 103).

In some embodiments, the operating environment 100 may further comprise a downstream technology element 103. The downstream technology element 103 may be a computing system within the network environment that may serve as the destination for network data transmitted from the upstream technology element 102. In some embodiments, the downstream technology element 103 may be a computing system that is operated by a user 104, such as an administrator or employee of the entity. Accordingly, the downstream technology element 103 may be a computing system such as a desktop computer, laptop computer, smartphone or smart device, tablet, single board computer, or the like, though it is within the scope of the disclosure for the downstream technology element 103 to be any other kind of computing system as described herein (e.g., a "headless" computing system such as a server). Additionally or alternatively, the downstream technology element 103 may be a hardware or software element of one of said devices (i.e. a software application, input device, output device, and/or the like). The downstream technology element 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 104.

In this regard, the downstream technology element 103 may comprise a processing device 154 operatively coupled to a communication device 152 and a memory device 156 comprising data storage 158 and computer readable instructions 160. The data storage 158 of the downstream technology element 103, similar to that of the upstream technology element 102, may comprise a destination network traffic log 162 which may contain a historical log of data sent and/or received by the downstream technology element 103. Continuing the above example, the destination network traffic log 162 may contain a record indicating that the downstream technology element 103 has downloaded web data on port 80 from the upstream technology element 102. By reading the origin network traffic log 142 and the destination network traffic log 162, the downstream technology element management system 101 may generate a topology of the network, establish relationships, calculate likelihood scores, and implement remediation processes on the upstream technology element 102 and/or the downstream technology element 103 according to the calculated likelihood scores. Accordingly, in some embodiments, the downstream technology element management system 101 may be configured to hook into the process command loop of the upstream technology element 102 and/or the downstream technology element 103 to implement remediation steps (e.g., installation of antivirus software, memory/systems wipes, hardware/software disabling, and/or the like).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the technology elements may access one or more databases or datastores (not shown) to search for and/or retrieve information related to the service provided by the entity. The technology elements may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

Each computing system in the operating environment 100 may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems. The downstream technology element management system 101 may be in operative communication with a control system of a computing system to implement remediation steps (e.g., installation of antivirus software, memory/systems wipes, hardware/software disabling, and/or the like).

FIG. 2 illustrates a process flow 200 for tracking, predicting, and remediating computing system breaches using network traffic data, in accordance with some embodiments of the present disclosure. The process begins at block 201, where the system detects a topology of one or more technology elements in a network, the one or more technology elements comprising an upstream technology element and a downstream technology element. In this regard, the upstream technology element and downstream technology element may be computing systems or hardware or software elements of computing systems that may have a unidirectional and/or bidirectional flow of network traffic. In some embodiments, the upstream technology element may be a computing system or an element of a computing system which may be the origination point or source that may first become compromised by a vector. In such embodiments, the downstream technology element may be a computing system or an element of a computing system to which the vector may be transferred or spread via lateral movement of the vector. It will be appreciated by those skilled in the art that the upstream technology element may be an element of a same computing system as the downstream technology element in some instances (e.g., with respect to certain vectors).

In an exemplary embodiment, the upstream technology element may be a server on the network that may host one or more data files to be transferred to one or more client devices (e.g., a web server), whereas the downstream technology element may be a user computing system that may be operated by the user to access the one or more data files stored within the upstream technology element. In such a scenario, the system may detect the relationship between the upstream technology element and the downstream technology element and map such a relationship using a graph database. For instance, the upstream technology element and the downstream technology element may each be stored as nodes within the graph database, where each node may be associated with one or more properties that further define the nature of the upstream technology element and/or the downstream technology element. Examples of such properties may include descriptions of the technology element (e.g., "server," "client," or the like), hardware information (e.g., serial numbers, model numbers, hardware ID's, MAC addresses, and the like), software information (e.g., installed applications, kernel version, operating system information, and the like), and the like. The relationships of the graph database between the upstream technology element and the downstream technology element may indicate a flow of a certain type of network traffic (e.g., a data transfer from the upstream technology element to the downstream technology element on a particular network port).

The process continues to block 202, where the system retrieves one or more historical network traffic logs from the one or more computing systems in the network. In particular, the system may retrieve a historical network traffic log from the computing system comprising the upstream technology element (e.g., an origin network traffic log) and/or the computing system comprising the downstream technology element (e.g., a destination network traffic log). The network traffic log may indicate the network traffic transmitted to other computing systems and/or received from other computing systems. Accordingly, each computing system within the network may host its own network traffic log. By reading the network traffic logs of each computing system, the system may be able to generate a graph database which reflects the topology of the network.

The process continues to block 203, where the system, based on the one or more historical network traffic logs, detects one or more data transfers between the upstream technology element and the downstream technology element. In this regard, the system may read the origin network traffic log to determine what data transfers have occurred between the upstream technology element and the downstream technology element. In some embodiments, the system may further read the destination network traffic log and perform a validation check on the origin network traffic log using the destination network traffic log. Continuing the above example, the origin network traffic log may indicate that an executable file was transferred from the upstream technology element to the downstream technology element on network port 21. The system may then search the destination network traffic log for a record of the file transfer according to the origin network traffic log.

In some embodiments, the system may further maintain a data store of hash values of one or more network traffic logs to be used for integrity verification purposes. In this regard, the data store may, in some embodiments, be a distributed register of hashed network traffic logs that may be hosted on one or more distributed servers and maintained using a consensus algorithm. In such embodiments, the system may generate a hash value of the origin network traffic log and/or the destination network traffic log and compare the generated hash values with the hash values stored within the distributed register of hash values. If a match is detected, the system may determine that the network traffic logs of the computing system of the upstream technology element and/or the computing system of the downstream technology element are valid and have not been compromised (e.g., by a vector).

The process continues to block 204, where the system generates a ranked list of likelihood scores for each of the one or more data transfers, wherein the likelihood scores reflect a likelihood of lateral movement of a vector from the upstream technology element to the downstream technology element through the one or more data transfers. In this regard, the system may use an artificial intelligence-based machine learning algorithm to evaluate various parameters associated with each data transfer and calculate the likelihood scores based on the parameters. Each likelihood score may be associated with a particular vector to be tracked by the system. Examples of such parameters may include historical data on vectors, intelligence data on vectors, the type of data transferred (e.g., executable files, image files, video files, or the like), data transfer frequency, software and/or hardware configurations, application and/or operating system versions, or the like.

Once the parameters have been identified, the system may compute increases or decreases to the likelihood scores based on the parameters. Accordingly, a data transfer that includes a file transfer of an executable file may have a comparatively higher likelihood score than a transfer of an image. The likelihood score may further increase, for instance, if the upstream technology element and/or downstream technology element are running vulnerable operating systems, have outdated anti-malware software and/or definitions, have high transfer frequencies to computing systems, or the like. In some embodiments, the likelihood score may further increase based on the magnitude of potential ramifications of infection by a certain vector. For example, a data transfer that may result in loss or leaking of highly sensitive data may be assigned a higher likelihood score.

Once the system has generated likelihood scores for the various data transfers within the network, the system may order the likelihood scores into a ranked list of likelihood scores. In some embodiments, the likelihood scores may be arranged in a decreasing order with higher likelihood scores appearing first in the ranked list. In other words, the ranked list of likelihood scores may be a list of data transfers that ordered according to the likelihood of transmission of a particular vector and/or the potential ramifications of transmission of said vector. In such scenarios, the ranked list may provide the system with a way to prioritize remediation of data transfers with high likelihood scores, thereby allowing the system to efficiently allocate resources to remediating vector transmission.

The process concludes at block 205, where the system, based on the ranked list of likelihood scores, automatically implements one or more remediation steps associated with the vector. The one or more remediation steps may be dependent on the type of vector associated with the likelihood scores and/or the characteristics or properties of the technology elements for which the likelihood scores were calculated. Accordingly, examples of such remediation steps may include updating applications and/or operating systems, installing updated anti-malware definitions, changing firewall configurations, applying a network segmentation and/or isolation scheme, wiping the memory and/or storage of the computing system, disabling a hardware or software technology element, disabling an input device and/or output device, and/or the like. The remediation steps may, in some embodiments, be applied or executed without any input required from a user. In some embodiments, the system may apply remediation steps based on the magnitude of the likelihood score. For instance, the less invasive remediation steps (e.g., applying software updates) may be used in cases of relatively low likelihood scores, whereas the more invasive remediation steps (e.g., wiping the memory of the affected computing systems) may be used in cases of relatively high likelihood scores. In this way, the system provides a dynamic and efficient way to remediate the possibility of vector transmission across the computing systems and technology elements in the network environment.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for detecting and remediating computing system breaches by monitoring a downstream technology element, the system comprising:
   a memory device with computer-readable program code stored thereon;
   a communication device; and
   a processing device operatively coupled to the memory device and the communication device, wherein the processing device is configured to execute the computer-readable program code to:
   detect a topology of one or more computing systems in a network, the one or more computing systems comprising an upstream technology element and the downstream technology element;
   retrieve one or more historical network traffic logs from the one or more computing systems in the network, wherein the one or more historical traffic logs comprises an origin network traffic log stored on a first computing system associated with the upstream technology element and a destination network traffic log stored on a second computing system associated with the downstream technology element;
   based on the one or more historical network traffic logs, identify, from the origin network traffic log, one or more outgoing data transfers from the upstream technology element to the downstream technology element;
   match, using the destination network traffic log, the one or more outgoing data transfers with one or more incoming data transfers from the upstream technology element to the downstream technology element;
   generate a computed hash of the origin network traffic log using a hash algorithm;
   retrieve a validation hash associated with the origin network traffic log from an integrity validation data store hosted on a distributed server network;
   execute a validation check of the origin network traffic log by comparing the computed hash of the origin network traffic log with the validation hash associated with the origin network traffic log, wherein the validation check verifies the integrity of the data from the one or more origin network traffic logs for each of the one or more affected computing systems;
   generate a ranked list of likelihood scores for each of the one or more data transfers, wherein the likelihood scores reflect a likelihood of lateral movement of a vector from the upstream technology element to the downstream technology element through the one or more data transfers;
   based on a first likelihood score exceeding a first predetermined value, automatically update a security software of one or more affecting computing systems; and
   based on the first likelihood score exceeding a second predetermined value, wherein the second predetermined value is greater than the first predetermined value, automatically erase a memory of the one of more affected computing systems.

2. The system according to claim 1, wherein the computer-readable program code, when executed by the processing device, further causes the processing device to generate a graph database based on the topology of the one or more computing systems in the network, wherein the graph database comprises a first node representing the upstream technology element and a second node representing the downstream technology element, wherein the first node is linked to the second node by a relationship comprising the one or more data transfers between the upstream technology element and the downstream technology element.

3. The system according to claim 1, wherein generating the ranked list of likelihood scores comprises:
identifying one or more parameters associated with the one or more data transfers between the upstream technology element and the downstream technology element; and
computing increases or decreases to the likelihood scores based on the one or more parameters.

4. The system according to claim 3, wherein the one or more parameters comprises at least one of vector intelligence data, data transfer type, and operating system version.

5. A computer program product for detecting and remediating computing system breaches by monitoring a downstream technology element, the computer program product comprising at least one non-transitory computer readable medium having computer-readable program code portions embodied therein, the computer-readable program code portions comprising executable code portions for:
detecting a topology of one or more computing systems in a network, the one or more computing systems comprising an upstream technology element and the downstream technology element;
retrieving one or more historical network traffic logs from the one or more computing systems in the network, wherein the one or more historical traffic logs comprises an origin network traffic log stored on a first computing system associated with the upstream technology element and a destination network traffic log stored on a second computing system associated with the downstream technology element;
based on the one or more historical network traffic logs, identifying, from the origin network traffic log, one or more outgoing data transfers from the upstream technology element to the downstream technology element;
matching, using the destination network traffic log, the one or more outgoing data transfers with one or more incoming data transfers from the upstream technology element to the downstream technology element;
generating a computed hash of the origin network traffic log using a hash algorithm;
retrieving a validation hash associated with the origin network traffic log from an integrity validation data store hosted on a distributed server network;
executing a validation check of the origin network traffic log by comparing the computed hash of the origin network traffic log with the validation hash associated with the origin network traffic log, wherein the validation check verifies the integrity of the data from the one or more origin network traffic logs for each of the one or more affected computing systems;
generating a ranked list of likelihood scores for each of the one or more data transfers, wherein the likelihood scores reflect a likelihood of lateral movement of a vector from the upstream technology element to the downstream technology element through the one or more data transfers;
based on a first likelihood score exceeding a first predetermined value, automatically updating a security software of one or more affecting computing systems; and
based on the first likelihood score exceeding a second predetermined value, wherein the second predetermined value is greater than the first predetermined value, automatically erasing a memory of the one of more affected computing systems.

6. The computer program product according to claim 5, wherein the computer-readable program code portions further comprise executable code portions for generating a graph database based on the topology of the one or more computing systems in the network, wherein the graph database comprises a first node representing the upstream technology element and a second node representing the downstream technology element, wherein the first node is linked to the second node by a relationship comprising the one or more data transfers between the upstream technology element and the downstream technology element.

7. The computer program product according to claim 5, wherein generating the ranked list of likelihood scores comprises:
identifying one or more parameters associated with the one or more data transfers between the upstream technology element and the downstream technology element; and
computing increases or decreases to the likelihood scores based on the one or more parameters.

8. The computer program product according to claim 7, wherein the one or more parameters comprises at least one of vector intelligence data, data transfer type, and operating system version.

9. A computer-implemented method for detecting and remediating computing system breaches by monitoring a downstream technology element, wherein the computer-implemented method comprises:
detecting a topology of one or more computing systems in a network, the one or more computing systems comprising an upstream technology element and the downstream technology element;
retrieving one or more historical network traffic logs from the one or more computing systems in the network, wherein the one or more historical traffic logs comprises an origin network traffic log stored on a first computing system associated with the upstream technology element and a destination network traffic log stored on a second computing system associated with the downstream technology element;
based on the one or more historical network traffic logs, identifying, from the origin network traffic log, one or more outgoing data transfers from the upstream technology element to the downstream technology element;
matching, using the destination network traffic log, the one or more outgoing data transfers with one or more incoming data transfers from the upstream technology element to the downstream technology element;
generating a computed hash of the origin network traffic log using a hash algorithm;
retrieving a validation hash associated with the origin network traffic log from an integrity validation data store hosted on a distributed server network;
executing a validation check of the origin network traffic log by comparing the computed hash of the origin network traffic log with the validation hash associated with the origin network traffic log, wherein the validation check verifies the integrity of the data from the one or more origin network traffic logs for each of the one or more affected computing systems;
generating a ranked list of likelihood scores for each of the one or more data transfers, wherein the likelihood scores reflect a likelihood of lateral movement of a vector from the upstream technology element to the downstream technology element through the one or more data transfers;

based on a first likelihood score exceeding a first predetermined value, automatically updating a security software of one or more affecting computing systems; and based on the first likelihood score exceeding a second predetermined value, wherein the second predetermined value is greater than the first predetermined value, automatically erasing a memory of the one of more affected computing systems.

10. The computer-implemented method according to claim 9, wherein the computer-implemented method further comprises generating a graph database based on the topology of the one or more computing systems in the network, wherein the graph database comprises a first node representing the upstream technology element and a second node representing the downstream technology element, wherein the first node is linked to the second node by a relationship comprising the one or more data transfers between the upstream technology element and the downstream technology element.

11. The computer-implemented method according to claim 9, wherein generating the ranked list of likelihood scores comprises:

identifying one or more parameters associated with the one or more data transfers between the upstream technology element and the downstream technology element; and computing increases or decreases to the likelihood scores based on the one or more parameters.

12. The computer-implemented method according to claim 11, wherein the one or more parameters comprises at least one of vector intelligence data, data transfer type, and operating system version.

13. The system of claim 1, wherein network traffic data from each of the one or more network traffic logs is tracked to predict breach vector pathways and behaviors.

* * * * *